Figure 1:
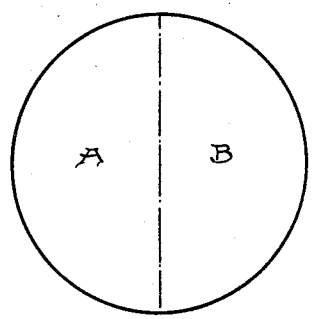

March 24, 1959 C. W. KANOLT 2,878,721
MULTIFOCAL OPHTHALMIC LENSES
Filed Feb. 3, 1954 4 Sheets-Sheet 1

Clarence W. Kanolt
INVENTOR.

BY
Pennie, Edmonds, Morton, Barrows,
& Taylor
ATTORNEYS

Clarence W. Kanolt
INVENTOR.

BY
Pennie, Edmonds, Morton, Barrows,
& Taylor
ATTORNEYS

March 24, 1959 C. W. KANOLT 2,878,721
MULTIFOCAL OPHTHALMIC LENSES
Filed Feb. 3, 1954 4 Sheets-Sheet 3

Clarence W. Kanolt
INVENTOR.

BY
Pennie, Edmonds, Morton, Barrows,
& Taylor
ATTORNEYS

March 24, 1959 C. W. KANOLT 2,878,721
MULTIFOCAL OPHTHALMIC LENSES
Filed Feb. 3, 1954 4 Sheets-Sheet 4

Clarence W. Kanolt
INVENTOR.

BY
Pennie, Edmonds, Morton, Barrows,
+ Taylor
ATTORNEYS

United States Patent Office 2,878,721
Patented Mar. 24, 1959

2,878,721

MULTIFOCAL OPHTHALMIC LENSES

Clarence W. Kanolt, Yonkers, N.Y., assignor to Farrand Optical Co., Inc., New York, N.Y., a corporation of New York Application February 3, 1954, Serial No. 407,970

13 Claims. (Cl. 88—54)

This invention relates to lenses and more particularly to multifocal ophthalmic lenses.

Many types of lenses have been employed in spectacles or eye glasses to correct one or more defects in the vision of the wearer. Frequently a wearer may need more than one pair of eye glasses and thus he may use one pair for normal usage and a second pair for close work such as reading. Although the use of two pairs of eye glasses will enable a person with weak vision to compensate for such vision, such use is extremely inconvenient and annoying to the wearer who is constantly required to keep two pairs of spectacles with him or search for the pair of spectacles he needs for a particular use, but which he has mislaid.

The solution to such a problem was the use of spectacles having bifocal lenses. These bifocal lenses are designed so that the lower sector of each lens has a dioptric power considerably higher than that of the upper sector. By so designing lenses a wearer no longer needs to have two pairs of spectacles, one for normal usage and one for close work such as reading, drafting, etc. The bifocal lenses enabled the wearer to look through the upper sector of the lens to correct the eyes for normal usage and to look through the lower sector of the lens having higher dioptric power for detail work or reading.

While bifocal lenses solved the problem of inconvenience and annoyance, they created an additional disadvantage of their own. A bifocal lens has a sharp line of demarcation where the upper sector of the lens meets the lower sector having higher dioptric power. This discernible line of demarcation produces an annoying blur before the eyes of the wearer when looking through the lens at that line.

This invention overcomes such a disadvantage by providing a lens having a gradually and continuously increasing dioptric power from the upper sector of the lens to the lower sector without any abrupt transition near the vertical axis of the lens such as occurs at the line of demarcation of bifocal lenses of the conventional type. In designing such a lens, which may be termed a multi-focal lens, a further problem is introduced. This problem results from the fact that a multifocal lens must inevitably possess some amount of astigmatism in some part thereof. If the amount of astigmatism is too great, it will destroy the sharpness of the views seen through the lens. Therefore in an acceptable design the amount of astigmatism must not exceed about ⅜ diopter in the central part of the lens and not substantially more than ⅞ diopter and preferably ⅝ diopter at the margin. Hence, this invention further provides a lens having a dioptric power gradually increasing from the top of the lens to the bottom without the amount of astigmatism produced by any part of the lens becoming objectionably high and exceeding the limits set forth above.

The ophthalmic lens constituting this invention has a special multifocal surface on one face of the lens, preferably the rear face of the lens or the face nearest the eye of the wearer. The other face of the lens may be given a spherical, cylindrical or toroidal form adapted to compensate for the imperfections of the eye of the user. The shape of the lens having this multifocal surface is best described in reference to a vertical plane tangent to the lens at the center thereof. The contour lines of such a lens surface when referred to this reference plane are in the upper sector of the face of the lens concave downward near the vertical axis of the lens and convex downward near the marginal portions; and in the lower sector of the face of the lens are convex downward near the vertical axis and concave downward near the marginal portions. The lens has a difference in dioptric power which increases gradually and continuously from the top of the upper sector to the bottom of the lower sector and has no discernible line of demarcation along the vertical axis of the lens between the portions of different dioptric power. The difference in dioptric power may be from −1 at the top of the upper sector to +1 at the bottom of the lower sector or, for example, from −6 diopters at the top of the upper sector to −4 at the bottom of the lower sector. In the examples given above, the difference in dioptric power, or "add," has been 2 diopters. However, any other "add" not excessively high may also be used. In addition in the present lens the astigmatism does not exceed ⅜ diopter in the central part of the lens and not substantially more than ⅞ diopter and preferably ⅝ diopter at the marginal portions.

The invention will be described further in connection with the drawings which illustrate several embodiments of the invention. However, it will be understood that these embodiments of the invention are by way of exemplification and not by way of limitation and the invention is limited only to the extent set forth in the appended claims.

Figure 2:
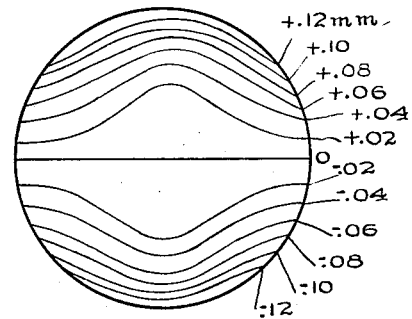
Figure 3:
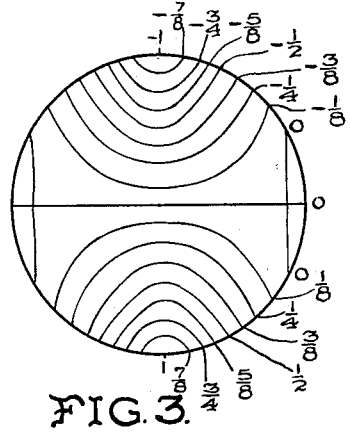
Figure 4:
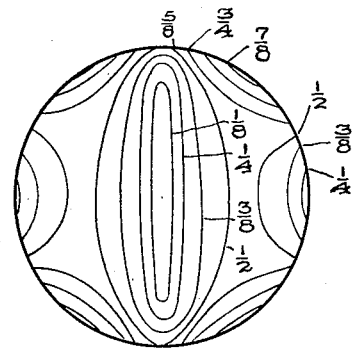
Figure 5:
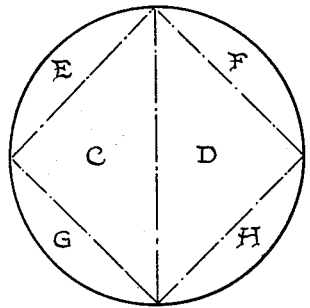
Figure 6:
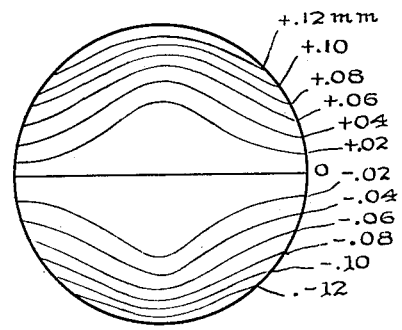
Figure 7:
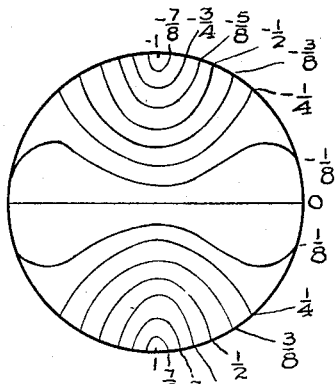
Figure 8:
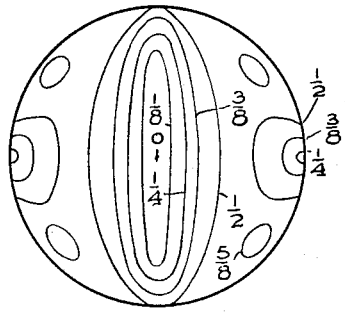
Figure 9:
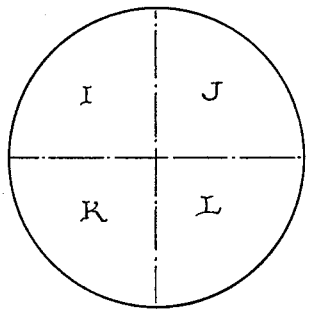
Figure 10:
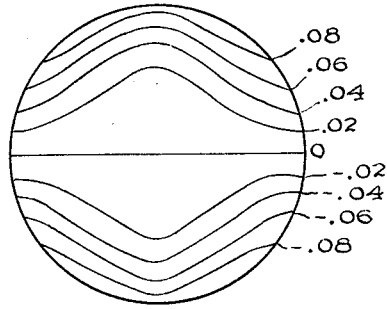
Figure 11:
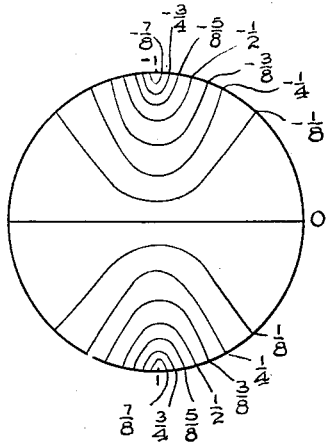
Figure 12:
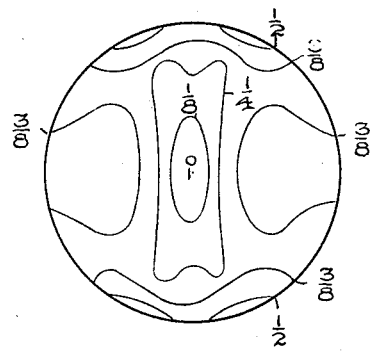
Figure 13:
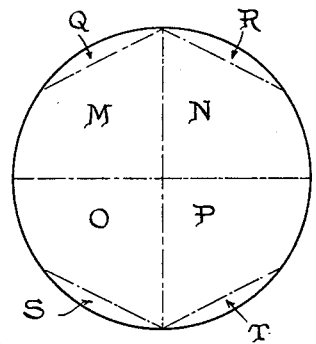
Figure 14:
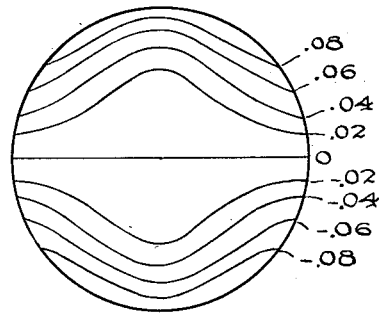
Figure 15:
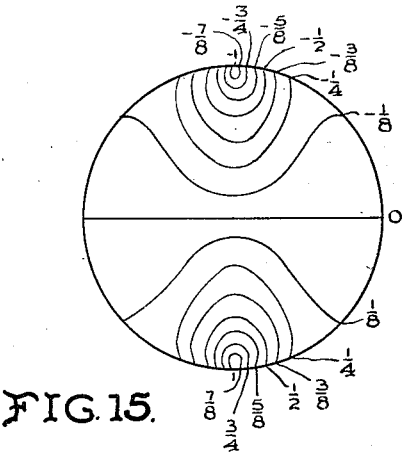
Figure 16:
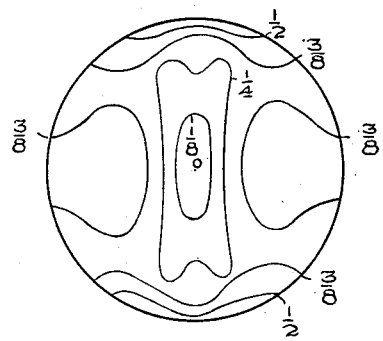
Figure 17:
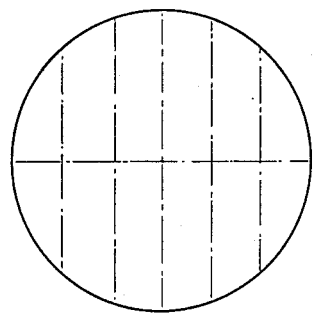
Figure 18:
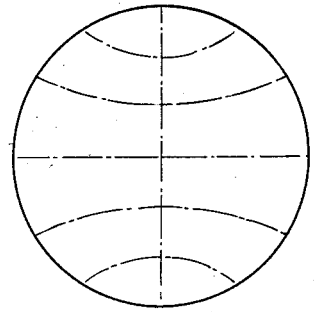
Figure 19:
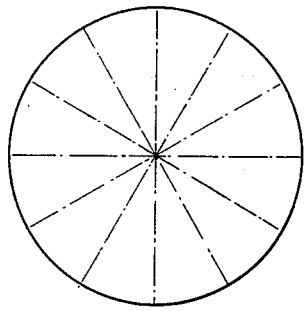
Figure 20:
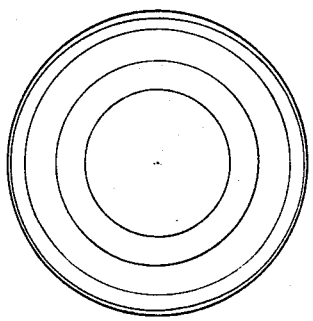
Figure 21:
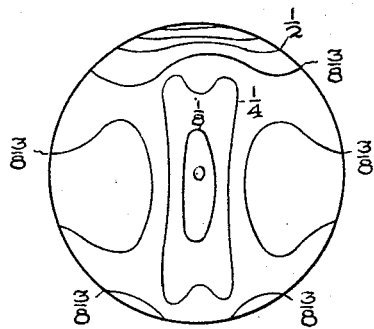
Figure 22:
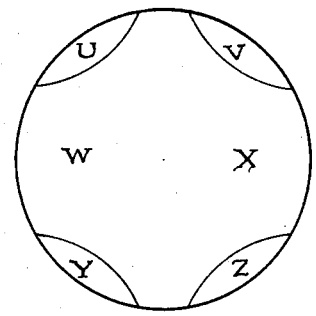
Figure 23:
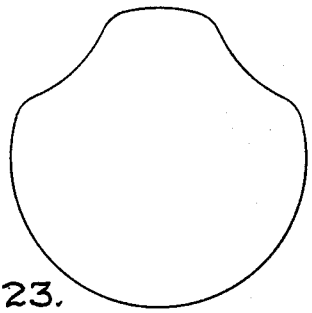
Figure 25:
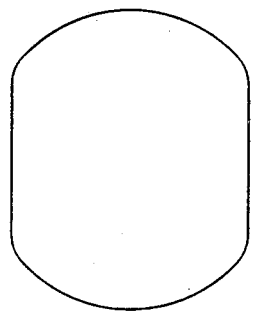
Figure 24:
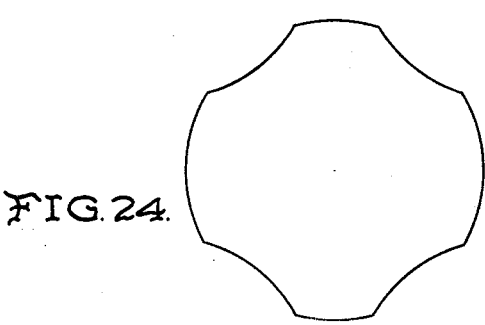

In the drawings,

Figs. 1, 2, 3, and 4 show one embodiment of my invention,

Fig. 1 is an elevational view of a lens showing the lens surface divided into two areas for purposes of computation hereinafter referred to, Fig. 2 is an elevational view of a lens showing the contour lines of the surface of the lens with reference to a plane tangent to the lens surface at its middle point and with the contour lines being placed at 0.02 mm. intervals, Fig. 3 is an elevational view of a lens showing the distribution of dioptric power with lines placed at ⅛ diopter intervals to indicate changes in the mean dioptric power, Fig. 4 is an elevational view of a lens showing the distribution of the amount of astigmatism with lines placed at ⅛ diopter intervals to indicate changes in the amount of astigmatism, Figs. 5, 6, 7, and 8 show a second embodiment of the invention, Fig. 5 is an elevational view of a lens showing the lens surface divided into six areas for purposes of computations hereinafter referred to, Fig. 6 is an elevational view of a lens showing the contour lines of the surface of the lens as with reference to a plane tangent to the lens surface at its middle point and with the contour lines placed at 0.02 mm. intervals, Fig. 7 is an elevational view of a lens showing the distribution of dioptric power with lines placed at ⅛ diopter intervals to indicate changes in the mean dioptric power, Fig. 8 is an elevational view of a lens showing the distribution of the amount of astigmatism with lines placed at ⅛ diopter intervals to indicate changes in the amount of astigmatism, Figs. 9, 10, 11 and 12 show a third embodiment of the invention, Fig. 9 is an elevational view of a lens showing the lens surface divided into four areas for purposes of computation hereinafter referred to, Fig. 10 is an elevational view of a lens showing the contour lines of the surface of the lens as with reference to a plane tangent to the lens surface at its middle point and with the contour lines placed at 0.02 mm. intervals, Fig. 11 is an elevational view of a lens showing the distribution of dioptric power with lines placed at ⅛ diopter intervals to indicate changes in the mean dioptric power, Fig. 12 is an elevational view of a lens showing the distribution of the amount of astigmatism with lines placed at ⅛ diopter intervals to indicate changes in the amount of astigmatism, Figs. 13, 14, 15, and 16 show a fourth embodiment of the invention, Fig. 13 is an elevational view of a lens showing the lens surface divided into eight areas for purposes of computation hereinafter referred to, Fig. 14 is an elevational view of a lens showing the contour lines of the surface of the lens with reference to a plane tangent to the lens surface at its middle point and with the contour lines placed at 0.02 mm. intervals, Fig. 15 is an elevational view of a lens showing the distribution of dioptric power with lines placed at ⅛ diopter intervals to indicate changes in the mean dioptric power, Fig. 16 is an elevational view of a lens showing the distribution of the amount of astigmatism with lines placed at ⅛ diopter intervals to indicate changes in the amount of astigmatism, Figs. 17, 18 and 19 are elevational views of lenses showing additional ways of dividing the lens surface into areas for computation purposes, Fig. 20 is an elevational view of a lens showing the contour lines of the surface of a lens having a power of —6 diopters at the top of the lens face and a power of —4 diopters at the bottom of the lens face, Fig. 21 is an elevational view of a lens showing a shift in the astigmatism shown in Fig. 16 to less objectionable areas, Fig. 22 is an elevational view of a lens showing the lens surface divided into six areas for purposes of computations hereinafter referred to and wherein the lens surface has no areas of objectionable astigmatism, and Figs. 23, 24, and 25 are elevational views of lenses showing the outline of lenses wherein areas of objectionable astigmatism have been removed.

The shape of the lens surface will be described in most cases by reference to a vertical plane with an origin of coordinates opposite the center of the lens and with rectangular coordinates $x$ and $y$, $x$ being postive to the right and $y$ being positive vertically. A third rectangular coordinate $z$ is used to represent the perpendicular distance of a point on the surface from the reference plane. The $z$ coordinate will be taken to be positive in the direction away from the lens surface.

The form of the surface will usually be given by a function expressing the value of $z$ in terms of $x$ and $y$. The following commonly used symbols will be employed:

$$p=\frac{\partial z}{\partial x}; \quad q=\frac{\partial z}{\partial y}; \quad r=\frac{\partial^2 z}{\partial x^2}; \quad s=\frac{\partial^2 z}{\partial x \partial y}; \quad t=\frac{\partial^2 z}{\partial y^2}$$

Since the value of a design depends on the distribution of dioptric power and astigmatism over the surface, it appears necessary to present the mathematical methods by which these quantities can be calculated from the function expressing the form of the surface.

It is known that any curved surface has at each point at which there is continuity two principal directions of curvature, with radii of curvature that will be designated here by $\rho_1$ and $\rho_2$, of which one has a maximum value as compared with the radii of curvature in other directions and one has a minimum value. It is known also that these two directions are at right angles to each other. The only exceptions to this condition are presented by a spherical surface, which has the same curvature in all directions, and a plane, which has no curvature in any direction. Some other surfaces have equal curvature in all directions at isolated points only.

It is customary to define the dioptric power of a spherical surface as the quantity $$\frac{1000(n-1)}{\rho}$$

where $\rho$ is the radius of curvature measured in millimeters, and $n$ is the refractive index of the material. If the surface is concave, its dioptric power is negative; if it is convex, its power is positive. Thus if $\rho$ is regarded as postive when the center of curvature is on the material side of the surface and negative in the opposite case, the formula gives the correct sign of the dioptric power.

The mean dioptric power, $\alpha$, at a point on a surface whose principal radii of curvature are in general not equal will be defined as $$\alpha=1000(n-1)\left[\frac{1}{2}\left(\frac{1}{\rho_1}+\frac{1}{\rho_2}\right)\right]=500(n-1)\left(\frac{1}{\rho_1}+\frac{1}{\rho_2}\right) \quad (1)$$

The same rule as to signs will apply here. Astigmatism, $\beta$, is generally defined with respect to a point on a surface and two perpendicularly disposed planes intersecting thereat, the first or sagittal plane established by the minimum radius of curvature $\rho_1$ of the lens at the point and the second or meridional plane established by the maximum radius of curvature $\rho_2$ of the lens at the point, then the magnitude of the astigmatism is taken as the difference in the dioptric power of the lens in the first plane and the dioptric power of the lens in the second plane. The amount of astigmatism at any point on the surface of the lens is measured by the difference in the dioptric power in the sagittal plane and the meridional plane at a given point. As a mathematical expression astigmatism is arbitrarily given a positive sign and defined as $$\beta=1000(n-1)\left(\frac{1}{\rho_1}-\frac{1}{\rho_2}\right) \quad (2)$$

It is known that the principal radii of curvature of any analytic surface are represented by the equation $$\frac{1}{\rho}=-\frac{1}{2(1+p^2+q^2)^{3/2}}\left\{(1+p^2)t+(1+q^2)r-2pqs \pm \sqrt{[(1+p^2)t+(1+q^2)r-2pqs]^2-4(rt-s^2)(1+p^2+q^2)}\right\} \quad (3)$$

when the sign of $\rho$ is determined in the manner stated.

This equation gives two values of $$\frac{1}{\rho}$$

namely $$\frac{1}{\rho_1}$$

and $$\frac{1}{\rho_2}$$

depending upon the sign of the radical.

From Equation (3) the following equations are derived:

$$\frac{1}{\rho_1}+\frac{1}{\rho_2}=-\frac{(1+p^2)t+(1+q^2)r-2pqs}{(1+p^2+q^2)^{3/2}} \quad (4)$$

$$\frac{1}{\rho_1}-\frac{1}{\rho_2}=-\frac{1}{(1+p^2+q^2)^{3/2}}\sqrt{[(1+p^2)t+(1+q^2)r-2pqs]^2-4(rt-s^2)(1+p^2+q^2)} \quad (5)$$

Applying Equation (4) to the definitions of $\alpha$ given by Equation (1):

$$\alpha = -500(n-1)\frac{(1+p^2)t+(1+q^2)r-2pqs}{(1+p^2+q^2)^{3/2}} \quad (6)$$

Applying Equation (4) to the definition of $\beta$ given by Equation (2) and employing arbitrarily the positive sign:

$$\beta = \frac{1000(n-1)}{(1+p^2+q^2)^{3/2}}\sqrt{[(1+p^2)t+(1+q^2)r-2pqs]^2-4(rt-s^2)(1+p^2+q^2)} \quad (7)$$

If the $x, y$ reference plane is taken in such a position that its direction is about the same as the average direction of the lens surface, the quantities $p$ and $q$, which represent the components of the slope of the curved surface relative to the plane, will be very small. This condition can be achieved by making the reference plane tangent to the lens surface at a point at or near its center. The quantities $p$ and $q$ occur in Equations (6) and (7) only as the squares $p^2$ and $q^2$ and the product $pq$, and when such quantities are small, simpler expressions can be obtained for $\alpha$ and $\beta$ that are close approximations by setting $p$ and $q$ equal to zero in Equations (6) and (7). This gives the equations:

$$\alpha = -500(n-1)(r+t) \quad (8)$$

$$\beta = 1000(n-1)\sqrt{(t-r)^2+4s^2} \quad (9)$$

These approximations are quite close enough for most purposes.

For convenience of presentation the case will be considered in which the lens material has the refractive index $n=1.5000$, in which case Equations (8) and (9) reduce to the following equations:

$$\alpha = -250(r+t) \quad (10)$$

$$\beta = 500\sqrt{(t-r)^2+4s^2} \quad (11)$$

As previously indicated, the maximum difference in mean dioptric power $\alpha$ between the upper and the lower parts of the lens is designated as the "add." The lens forms presented here have been designed for an "add" of two diopters. A design having any other "add" not excessively high can be obtained from any of these by multiplying the height $z$ of the surface at all points by some constant factor. The "add," and at every point the mean dioptric power and the astigmatism, will be increased, to a close approximation, by this same factor.

The forms of optical surfaces in common use, such as plane, spherical, cylindrical, paraboloidal and ellipsoidal surfaces can be described in terms of analytic mathematical functions, that is, functions that have at all points on the surface of the lens continuous values and continuous derivatives of all orders. Such a function may be used to describe a surface suitable to some degree for use on a multifocal lens. However, it is difficult to find such a surface that is entirely satisfactory in presenting a suitable "add" without having in some regions excessive amounts of astigmatism. Therefore, several different analytic functions are used to describe different separate areas of the lens surface, but with the important condition that at the dividing line between any two such areas, the functions present no discontinuity of magnitude or derivatives of a kind that would be detrimental to the usefulness of the lens. This condition is obtained by so selecting the functions relating to two adjacent areas that at the dividing line between them the values of $z$ determined by the function and all their first and second derivatives, $p, q, r, s, t$, are identical for the two functions. Higher derivatives may not be identical.

In general this condition at the boundary between two areas will be secured if the functions describing $z$ in the two areas differ only by one or more terms each containing a factor that is equal to zero at all points of the boundary and is raised to the third or a higher power.

A somewhat less satisfactory design can be obtained if second order derivatives at a dividing line are permitted to be unequal, while the values of $z$ and the derivatives of the first order are equal. The form of optical surface in which the second derivatives also are equal is the preferred form. If the derivatives of the first order were not equal, there would be a line of demarcation that is a ridge or a valley in the lens surface at the dividing line between the two areas, as in the ordinary bifocal lenses, and the lens would give two images somewhat offset from each other.

The designs of lens surfaces that are described herein have been adapted to a lens diameter of 40 millimeters, and are designed to give an "add" of two diopters when the lens material has a refractive index of 1.5. They are presented in the manner in which they would be applied to the rear surface of a spectacle lens. Obviously, other values for diameter, "add" and refractive index could be employed. In the equations set forth below the dimensions are expressed in millimeters.

Considering first the embodiment of the invention shown in Figs. 1 through 4, the lens surface is divided into two areas designated as areas A and B. The equation of the surface in area B is:

$$z = .0_4 145y^3 + .0_4 4975x^2y - .0_5 156x^3y \quad (12)$$
$$+ .0_8 405y^5 - .0_7 23625x^2y^3$$

and that of the surface of area A is:

$$z = .0_4 145y^3 + .0_4 4975x^2y + .0_5 156x^3y \quad (13)$$
$$+ .0_8 405y^5 - .0_7 23625x^2y^3$$

where the subscripts in the equations indicate the number of zeros that follow to the right of the decimal point. The dividing line between the two areas is the line $x=0$. The two functions above differ only in a term in $x^3y$, and this function and all its first and second derivatives, which are terms in $x^2y$, $x^3$, $xy$, and $x^2$, are zero when $x=0$.

With reference to the embodiment of the invention shown in Figs. 5 through 8, this design has the lens surface divided into areas C, D, E, F, G, and H as shown in Fig. 5.

The equation of the surface in area D is Equation 12; and that of the surface in area C is Equation 13.

The equation of the surface in area F is:

$$z = .0_4 145y^3 + .0_4 4975x^2y - .0_5 156x^3y + .0_8 405y^5 \quad (14)$$
$$- .0_7 23625x^2y^3 - (x+y-20)^3[-.0_5 421 + .0_6 7315$$
$$(y-x) + .0_8 914(y-x)^2 + .0_8 1051 \ (y-x)^3]$$

That of area H is:

$$z = .0_4 145y^3 + .0_4 4975x^2y - .05156x^3y + .0_8 405y^5 \quad (15)$$
$$- .0_7 23625x^2y^3 - (x-y-20)^3[.0_5 421 + .0_6 7315$$
$$(x+y) - .0_8 914 \ (x+y)^2 + .0_8 1051 \ (x+y)^3]$$

That of area E is:

$$z = .0_4 145y^3 + .0_4 4975x^2y + .0_5 156x^3y + .0_8 405y^5 \quad (16)$$
$$- .0_7 23625x^2y^3 - (y-x-20)^3[-.0_5 421 + .0_6 7315$$
$$(x+y) + .0_8 914 \ (x+y)^2 + .0_8 1051 \ (x+y)^3]$$

That of area G is:

$$z = .0_4 145y^3 + .0_4 4975x^2y + .0_5 156x^3y + .0_8 405y^5 \quad (17)$$
$$- .0_7 23625x^2y^3 - (x+y+20)^3[-.0_5 421 - .0_6 7315$$
$$(y-x) + .0_8 914 \ (y-x)^2 - .0_8 1051 \ (y-x)^3]$$

The dividing line between areas C and D has the equation $x=0$, the same as the dividing line between A and B of Fig. 1. The dividing line between areas D and F has the equation $x+y-20=0$. Equation 12 relating to area D and Equation 14 relating to area F differ by a term having the factor $(x+y-20)^3$. This factor and all its first and second derivatives, namely:

first derivative relative to $x$: $3(x+y-20)^2$
first derivative relative to $y$: $3(x+y-20)^2$
second derivative relative to $x$: $6(x+y-20)$
second derivative relative to $x$ and $y$: $6(x+y-20)$
second derivative relative to $y$: $6(x+y-20)$ are equal to zero on the line the equation for which is $x+y-20=0$. Therefore, Equations 12 and 14 are equal at the dividing line between D and F, and all their first and second derivatives are equal at this line.

Similarly, the dividing line between areas D and H has the equation $$x-y-20=0 \qquad (18)$$

that between areas E and C has the equation $$-x+y-20=0 \qquad (19)$$

and that between areas C and G has the equation $$-x-y-20=0 \qquad (20)$$

At each of these dividing lines the functions on the two sides and their first and second derivatives are equal.

Referring now to Figs. 9 through 12, there is shown a third embodiment of the invention. The lens surface is divided into four areas, as shown in Fig. 9. The equation of the surface in area J is:

$$z = .0_4 145 y^3 + .0_4 4975 x^2 y - .0_5 236 x^3 y - .0_7 3195 y^5 \qquad (21)$$
$$- .0_7 23625 x^2 y^3 + .0_7 4 x^4 y + .0_8 12 y^6$$

The equation of the surface in area L is:

$$z = .0_4 145 y^3 + .0_4 4975 x^2 y - .0_5 236 x^3 y - .0_7 3195 y^5 \qquad (22)$$
$$- .0_7 23625 x^2 y^3 + .0_7 4 x^4 y - .0_8 12 y^6$$

The equation of the surface in area I is:

$$z = .0_4 145 y^3 + .0_4 4975 x^2 y + .0_5 236 x^3 y - .0_7 3195 y^5 \qquad (23)$$
$$- .0_7 23625 x^2 y^3 + .0_7 4 x^4 y + .0_8 12 y^6$$

The equation of the surface in area K is:

$$z = .0_4 145 y^3 + .0_4 4975 x^2 y + .0_5 236 x^3 y - .0_7 3195 y^5 \qquad (24)$$
$$- .0_7 23625 x^2 y^3 + .0_7 4 x^4 y - .0_8 12 y^6$$

The dividing line between areas J and I and between areas L and K is the line of $x=0$. The only term of $z$ that is different in J and I and in L and K is the term in $x^3 y$; and this term and all its first and second derivatives are zero when $x=0$.

The dividing line between areas J and L, and between areas I and K is the line of $y=0$. The only term that is different in J and L and in I and K is the term in $y^6$; and this term and its first and second derivatives are zero when $y=0$.

In another embodiment of the invention as shown in Figs. 13 through 16, the surface of the lens has been divided into eight areas as shown in Fig. 13. The equations of areas N, P, M, and O are Equations 21, 22, 23, and 24, respectively. The equation of the surface in area R is the same as Equation 21 except for the addition at the right hand side thereof of the term:

$$-.0_5 8 \; (x+2y-40)^3 \qquad (25)$$

The equation of the surface in area T is the same as Equation 22 except for the addition at the right hand side thereof of the term:

$$+.0_5 8 \; (-x+2y-40)^3 \qquad (26)$$

The equation of the surface in area Q is the same as Equation 23 except for the addition, at the right hand side thereof, of the term:

$$-.0_5 8 \; (x-2y-40)^3 \qquad (27)$$

The equation of the surface in area S is the same as Equation 24 except for the addition at the right hand side thereof of the term:

$$-.0_5 8 \; (x+2y+40)^3 \qquad (28)$$

The dividing line between areas N and M and between areas P and O is the line of $x=0$; that between areas M and O and between areas N and P is the line of $y=0$; that between areas N and R is the line $x+2y-40=0$; that between P and T is the line $x-2y-40=0$; that between Q and M is the line $-x+2y-40=0$; and that between S and O is the line $x+2y+40=0$.

A comparison of the four embodiments of the invention shown in Figs. 1 through 16 reveals a similarity of the division of the lens surfaces in Figs. 1 and 5, and a similarity in the division of the surfaces in Figs. 9 and 13. The surface of the lens shown in Fig. 1 is divided into two semicircular portions while the surface of the lens shown in Fig. 5 is also divided into two semicircular portions each of which is further divided by equal secants extending from the extremities of the base of the semicircle and meeting at the circumference of the semicircle. The lens surface shown in Fig. 9 is divided into quadrants as is the lens surface shown in Fig. 13. The lens surface in Fig. 13 is further divided by four equal secants extending from both sides of the extremities of the vertical axis of the lens.

Figs. 2, 6, 10, and 14, pertaining to the contour lines of the lens surface, show the similarity in the shape of the lens surface of the four embodiments. In each embodiment the contour lines are in reference to a plane tangent to the lens at the center thereof and are given at 0.02 mm. intervals. The contour lines in the upper part of the lens are concave downward near the vertical axis of the lens and convex downward near the marginal portions of the lens; and in the lower part of the lens are convex downward near the vertical axis and concave downward near the marginal portions. None of the contour lines has any sharp break therein such as would form a line of demarcation commonly found in bifocal lenses. The term "vertical axis" as used above is the vertical axis in the position of an ophthalmic lens in normal use. The concentration of the contour lines indicates the degree of curvature of the lens surface and hence it is apparent that the lens surfaces of the lenses shown in Figs. 2 and 6 have a more pronounced curvature than the flatter lenses shown in Figs. 10 and 14. Each of the lenses is flat along the horizontal axis thereof.

Figs. 3, 7, 11, and 15 show the distribution of dioptric power over the lens surface by means of lines connecting points of equal mean dioptric power. These lines have been placed at ⅛ diopter intervals. There is a continuously and gradually increasing dioptric power from the upper part of the lenses to the lower part of the lenses. An "add" of two diopters having been employed in each instance, there is thus achieved a power of +1 diopter at the top of the lenses, −1 diopter at the bottom of the lenses, and zero dioptric power along the horizontal axis of the lenses. The lens shown in Fig. 3 also has lines of zero dioptric power near the sides of the lens along lines parallel to the vertical axis of the lens. The figures also show how the concentration of dioptric power may be shifted over the lens surface depending upon the multifocal lens desired. Hence, in Figs. 3 and 7 the lines connecting points of equal dioptric power are spread rather evenly over the upper and lower halves of the lens surface, whereas in Figs. 11 and 15, these lines are concentrated near the vertical axes of the lenses and in particular near the extremities thereof.

The astigmatism produced by any part of the lenses is not objectionably high, since the astigmatism does not exceed ⅜ diopter in the central part of any of the lenses and not substantially more than ⅞ diopter and preferably not more than about ⅝ diopter at the marginal portions. A comparison of the figures show that the lens in Fig. 4 has the greatest astigmatism with the regions of greatest astigmatism therein occurring at the peripheral ends of radii at angles of approximately 45°, 135°, 225°, an 315°. The lenses in Figs. 12 and 16 have the least overall astigmatism as well as the least astigmatism in the marginal portions.

A comparison of the four embodiments further show that desirable distribution of dioptric power may have to be sacrificed at the expense of more desirable distribution of astigmatism and vice versa.

The lens surface may be divided into areas in which different analytic mathematical functions are employed in each area in many other ways than those shown in Figs. 1, 5, 9, and 13. Some of these ways are shown in Figs. 17, 18, and 19. In Fig. 17 the circular lens face has been divided into quadrants with four evenly spaced secants parallel to the vertical axis of the lens and two each lying on both sides of the vertical axis.

In Fig. 18 the lines dividing the lens into areas resemble the latitude lines on a globe with the addition of a vertical axis line of the lens.

The face of the lens may be divided into twelve equal sectors as shown in Fig. 19.

All four of the embodiments that have been presented up to this point possess what may be called "skew symmetry," in that the value of the coordinate $z$ at every point $x$, $-y$ in the lower half of the lens is the same as that at a symmetrically corresponding point $x$, $y$ in the upper half of the lens except that its sign is reversed. It results that the dioptric power at any point in the lower half is the same as at the corresponding point in the upper half except that it has the opposite sign. Since astigmatism always has been represented arbitrarily by a positive quantity, the astigmatism so represented is always the same at corresponding points on the lens surface. There is no intention to restrict the invention to this condition of skew symmetry and in some instances this skew symmetry may not be desirable or at least not desirable in the form previously described.

The four skew-symmetrical designs that have heretofore been described all have zero dioptric power along the horizontal axis of the lens, with the negative power above and the positive power below. This condition is not always desirable, though it may be convenient in designing a lens to begin with such a design. It may be desired, however, to make the dioptric power of the multifocal surface of the lens quite different from zero along the horizontal axis, but still with such gradual and continuous changes in dioptric power above and below as hereinbefore described. For example, if the rear surface of the lens is to be made the multifocal surface it may be desired to make this surface definitely concave and therefore of negative dioptric power, in conformity with a common practice. From any of the designs that have been described, a design having practically the same gradations of dioptric power over the surface but having at all points a higher or lower power than that of the original design can readily be obtained. For this purpose it is sufficient to add to the value of $z$ a value corresponding to the $z$ coordinate of a section of a spherical surface or of a cylindrical or toroidal surface. If this is done, the resulting surface will have at each point a power that is very nearly, though not precisely, the algebraic sum of the powers at this point of the original surface and of the spherical surface or cylindrical or toroidal surface.

For example, it may be desired to modify the design presented by Equations (12) and (13), making the power $-6$ diopters at the top and $-4$ diopters at the bottom, leaving the "add" 2 diopters, as before. This requires adding a power of $-5$ diopters over the entire surface. A concave spherical surface having this power on material with a refractive index of 1.500 would have a radius of curvature of 100 mm. and the $z$ coordinate of the surface would be $$z = 100 - \sqrt{10000 - x^2 - y^2} \quad (29)$$

Therefore a surface having very nearly the specified distribution of power will be represented in area B of Fig. 1 by the equation:

$$z = .0_4145y^3 + .0_4975x^2y - .0_5156x^3y + .0_8405y^5$$
$$- .0_723625x^2y^3 + 100 - \sqrt{10000 - x^2 - y^2} \quad (30)$$

and in area A by the equation:

$$z = .0_4145y^3 + .0_4975x^2y + .0_5156x^3y + .0_8405y^5$$
$$- .0_723625x^2y^3 + 100 - \sqrt{10000 - x^2 - y^2} \quad (31)$$

The contour lines of this surface are shown in the lens of Fig. 20. In this lens, lines of equal dioptric power would be essentially the same as in Fig. 3 except that each line would represent a power of 5 diopters less. Its lines of equal astigmatism would be essentially the same as in Fig. 4.

In order to place the regions of highest astigmatism in parts of the lens where they will be least objectionable, it may be desirable to shift the location of any of the forms of surface that have been described to areas higher or lower on the surface of the lens. If the distribution of dioptric power along the vertical axis of the lens is nearly linear, as it is in the form of lens previously described, such a change will make little difference in the amount of the "add." As an example, Fig. 21, as compared with Fig. 16, shows how the distribution of astigmatism would be changed in the design of Figs. 13, 14, 15, and 16 by shifting the calculated form of the lens surface downwardly on the face of the lens.

In the preferred embodiments of the invention the lenses have surfaces represented by different equations in different areas without objectionable discontinuities in the equations and consequently do not have excessive astigmatism. However, when a lens has excessive astigmatism in certain portions, such as the isolated marginal areas of Fig. 4, such excessive astigmatism may be avoided by altering the surface of each such section of excessive astigmatism to provide a new surface having less astigmatism, such as a spherical surface which is separated from the adjacent part of the lens by a boundary where dioptric power changes somewhat. This change of dioptric power will be similar to that at the boundary line of an ordinary bifocal lens, though of smaller magnitude. It will differ, however, from the condition in the bifocal lens in that the discontinuity of the surface occurs only in some lateral portion and not along the vertical axis where clarity of vision is most important.

Fig. 22 shows the division of the lens of Figs. 1, 2, 3, and 4 into areas as thus modified. It discloses a lens in which the area X still is represented by the Equation (12) and the area W by the Equation (13). However, in the area V the original surface of the lens is altered to provide a concave spherical surface having a radius of curvature of 1.500 mm., with its center of curvature at the point where $x = 26.0$ mm., $y = -27.9$ mm., and $z = 1499.43$ mm. Its dioptric power will be $$-\frac{1000(n-1)}{1500}$$

and if $n = 1.500$, for example, it will have a dioptric power of $-\frac{1}{3}$. The equation of the surface V is:

$$(x - 26.0)^2 + (y + 27.9)^2 + (z - 1499.43)^2$$
$$= 2{,}250{,}000 \quad (32)$$

The dividing line between the surface V and the surface in area X, which is determined by Equation (12), is the line on which the values of $z$ determined by Equations (12) and (32) are equal. This line is approximately in the position shown in Fig. 22.

In area Z the lens is provided with a surface similar to surface V having the equation:

$$(x - 26.0)^2 + (y - 27.9)^2 + (z + 1499.43)^2$$
$$= 2{,}250{,}000 \quad (33)$$

In area U the equation of the surface to avoid excessive astigmatism is:

$$(x + 26.0)^2 + (y + 27.9)^2 + (z - 1499.43)^2$$
$$= 2{,}250{,}000 \quad (34)$$

and in area Y is:

$$(x+26.0)^2+(y-27.9)^2+(z+1499.43)^2 = 2,250,000 \quad (35)$$

The dividing lines of the areas U, V, Y and Z in Fig. 22 are visible, while the vertical central line dividing area X from area W is not visible.

The parts of the surface to which spherical forms are given need not be limited in all lenses to such areas as U, V, Y and Z of Fig. 22. Thus any part of the lens possessing objectionable astigmatism may be altered to provide a new surface such as a spherical surface.

The visible dividing lines between different areas shown in Fig. 22 may be designed to have mathematical discontinuities in the first derivatives of $z$ and therefore in the slope. But it would be difficult or impossible to make such dividing lines mathematically sharp, for there would be, in practice, a slight rounding of the dividing ridges or grooves. This is true also of the dividing lines or ordinary bifocal lenses. At such dividing lines the slopes or the derivatives may be described as "essentially" discontinuous.

Excessive astigmatism may also be avoided by omitting from a lens, which might otherwise be circular in outline, the areas in which the equation of the surface gives high astigmatism. Thus, the lens of Figs. 1, 2, 3, and 4 might have sections thereof removed at the places of excessive astigmatism at the upper portion of the lens to provide a lens having the shape shown in Fig. 23. In Fig. 24, sections of the lens have been removed at both the upper and lower portions of the lens while in Fig. 25 sections of the lens have been removed from the two side portions thereof.

While these lenses have been designed primarily for use as ophthalmic lenses, other uses are contemplated, such as their use as supplementary lenses in cameras.

The lenses may be made by the drop method or the recently developed ultrasonic method.

I claim:

1. A multifocal lens having a surface, the shape of which can be represented by contour lines representative of gradual and substantially continuous change with respect to a plane tangent to the center of said surface and when so represented, a substantial number of the contour lines, with reference to a diameter, are outwardly convex at each side of said reference diameter along a second diameter at right angles thereto and are outwardly concave at each side of said reference diameter adjacent its ends, said surface further comprising contiguous areas in each of which the form of the surface can be represented by a different analytic function for each area whose terms are based on said reference plane, and when so represented the values of the analytic functions of two contiguous areas and at least the first derivatives in all directions on the surface are equal at all points along the boundary between said contiguous areas, the dioptric power of the lens changing gradually, substantially continuously, and by a substantial amount along said second diameter, the amount of astigmatism between the center of the lens and the marginal portions thereof being relatively small, and the convexity of the lens being greater at one side of said reference diameter than at the other.

2. A multifocal lens as set forth in claim 1 in which substantially all of the contour lines are as there defined.

3. A multifocal lens as set forth in claim 1 which has substantially zero dioptric power at the center thereof.

4. A multifocal lens as set forth in claim 1 in which at least one portion of said surface is spherical.

5. A multifocal lens as set forth in claim 1 in which at least one portion of said surface is cylindrical.

6. A multifocal lens as set forth in claim 1 in which at least one portion of said surface is toroidal.

7. A multifocal lens as set forth in claim 1 in which the amount of astigmatism does not exceed $\frac{3}{8}$ diopter in the center of the lens and is not substantially more than $\frac{7}{8}$ diopter in the marginal portions.

8. A multifocal lens as set forth in claim 7 in which the astigmatism in the marginal portions thereof does not substantially exceed $\frac{5}{8}$ diopter.

9. A multifocal lens as set forth in claim 1 in which the values of the analytic functions of two contiguous areas and the first and second derivatives in all directions along the surface are equal at the boundary between said contiguous areas.

10. A multifocal lens as set forth in claim 1 in which said surface is substantially symmetrical relative to a substantially horizontal plane passing through the center of the lens, and said lens has skew symmetry relative to a vertical plane passing through the center of the lens.

11. A multifocal lens as set forth in claim 1 in which the lens is an ophthalmic one and the second diameter is the vertical one.

12. A multifocal lens as set forth in claim 11 in which the dioptric power gradually increases throughout said vertical diameter and at least one marginal area laterally of said vertical diameter has a spherical surface.

13. A multifocal lens as set forth in claim 1 in which at all points along the boundary between said contiguous areas there is no abrupt change from one side of said boundary line to the other in respect to either the contour of the two areas relative to said reference plane, the dioptric power of the areas, or the magnitude of the astigmatism and the direction of its axis.

References Cited in the file of this patent
UNITED STATES PATENTS

| Number | Name | Date |
|---|---|---|
| Re. 15,007 | Paige | Dec. 14, 1920 |
| 1,106,629 | Cross | Aug. 11, 1914 |
| 1,143,316 | Poullain et al. | June 15, 1915 |
| 1,271,356 | Paige | July 2, 1918 |
| 1,518,405 | Glancy | Dec. 9, 1924 |
| 1,697,030 | Tillyer | Jan. 1, 1929 |
| 2,109,474 | Evans | Mar. 1, 1938 |
| 2,475,275 | Birchall | July 5, 1949 |